United States Patent
Ishikawa et al.

(10) Patent No.: US 11,396,318 B2
(45) Date of Patent: Jul. 26, 2022

(54) STEERING DEVICE

(71) Applicant: YAMADA MANUFACTURING CO., LTD., Kiryu (JP)

(72) Inventors: Tomoya Ishikawa, Kiryu (JP); Satoaki Ikeda, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 267 days.

(21) Appl. No.: 16/497,563

(22) PCT Filed: Mar. 26, 2018

(86) PCT No.: PCT/JP2018/011960
§ 371 (c)(1),
(2) Date: Sep. 25, 2019

(87) PCT Pub. No.: WO2018/181082
PCT Pub. Date: Oct. 4, 2018

(65) Prior Publication Data
US 2020/0023881 A1 Jan. 23, 2020

(30) Foreign Application Priority Data
Mar. 28, 2017 (JP) .............................. JP2017-063300

(51) Int. Cl.
*B62D 1/16* (2006.01)
*B62D 1/19* (2006.01)

(52) U.S. Cl.
CPC ............... *B62D 1/16* (2013.01); *B62D 1/195* (2013.01)

(58) Field of Classification Search
CPC .................................. B62D 1/16; B62D 1/195
See application file for complete search history.

(56) References Cited

U.S. PATENT DOCUMENTS

| 3,747,427 A | 7/1973 | Milton et al. |
| 7,228,755 B2 * | 6/2007 | Armstrong ............. B62D 1/195 280/777 |
| 7,367,588 B2 * | 5/2008 | Yamada ................ B62D 1/195 188/371 |

FOREIGN PATENT DOCUMENTS

| CN | 104602985 A | 5/2015 |
| JP | 4062187 | 1/2008 |
| JP | 2016-132308 | 7/2016 |

OTHER PUBLICATIONS

International Search Report, dated Jun. 19, 2018 (Jun. 19, 2018), 2 pages.

* cited by examiner

*Primary Examiner* — Jonathan Ng
*Assistant Examiner* — Joselynn Y Sliteris
(74) *Attorney, Agent, or Firm* — Rankin, Hill & Clark LLP (57) ABSTRACT

A steering device includes a bracket and right and left bolts. The bracket includes right and left side plates supporting a steering column from both sides, respectively, in a widthwise direction, and right and left flanges extending outwardly in the widthwise direction from respective upper ends of the right and left side plates. The bolts fasten the flanges to a mount surface of a vehicle body. The flanges include respective right and left internal protrusions protruding toward the mount surface from respective flange surfaces, which face the mount surface. The internal protrusions are located forwardly in a vehicle body back-and-forth direction relative to tightened positions of the bolts, and are located near respective internal edges of the flanges in the widthwise direction.

14 Claims, 8 Drawing Sheets

STEERING DEVICE

TECHNICAL FIELD

The present disclosure relates to a technology of mounting, to a vehicle body, a steering column that supports a steering shaft so as to be turnable in a steering device.

BACKGROUND ART

In general, a steering column is supported by a bracket. A flange of this bracket is fastened to a mount surface of a vehicle body by a bolt (see Patent Document 1).

According to a steering device disclosed in Patent Document 1, a steering column that supports a steering shaft so as to be turnable is mounted on a vehicle body by a bracket. This bracket includes right and left side plates that support the steering column from both sides, respectively, in the widthwise direction, and a mount plate that can be mounted on the vehicle body. The mount plate is a thin and flat plate elongated in the vehicle widthwise direction. Respective upper ends of the right and left side plates are joined to a lower surface of the mount plate. Portions of the mount plate located outwardly in the vehicle widthwise direction relative to the right and left side plates become mounted portions to the mount surface of the vehicle body by bolts.

CITATION LIST

Patent Literatures

Patent Document 1: JP2016-132308A

SUMMARY OF INVENTION

Technical Problem

The steering device disclosed in Patent Document 1 employs a structure in which the mount plate that is merely a flat plate is fastened to the mount surface of the vehicle body by bolts. Accordingly, the bending rigidity of the mount plate is relatively small. There is a leeway for improvement in order to firmly mount the steering device on the vehicle body.

An objective of the present disclosure is to provide a technology capable of firmly mounting a steering device on a vehicle body.

Solution to Problem

A steering device according to the present disclosure includes:

a steering column that supports a steering shaft so as to be turnable;

a bracket including: right and left side plates that support the steering column from both sides, respectively, in a widthwise direction; and right and left flanges that extend outwardly in the widthwise direction from respective upper ends of the right and left side plates; and right and left bolts that fasten the right and left flanges to a mount surface of a vehicle body, wherein the right and left flanges comprise respective right and left internal protrusions that protrude toward the mount surface from respective right and left flange surfaces which face the mount surface of the vehicle body, and wherein the right and left internal protrusions are located forwardly in a vehicle body back-and-forth direction relative to tightened positions of the right and left bolts, and are located near respective internal edges of the right and left flanges in the widthwise direction.

Preferably, the above-described steering device further includes right and left capsules which hold therebetween front and back surfaces of the respective right and left flanges, and which have a substantially U-shaped cross-sectional shape, wherein the right and left capsules comprise respective right and left vehicle-body-side capsule portions that are present between the mount surface and the respective right and left flanges, wherein the right and left internal protrusions are in contact with the respective right and left vehicle-body-side capsule portions, and wherein the right and left capsules are fastened to the mount surface of the vehicle body together with the respective right and left flanges by the respective right and left bolts.

Preferably, the above-described steering device further includes right and left external protrusions that protrude toward the mount surface of the vehicle body from the respective right and left flanges, wherein the right and left external protrusions are located forwardly in the vehicle body back-and-forth direction relative to the tightened positions of the right and left bolts, and are located near respective external edges of the right and left flanges in the widthwise direction.

More preferably, the right and left internal protrusions and the right and left external protrusions are each any one of the followings: expanded portions expanded from the respective right and left flanges; thickened portions of the respective right and left flanges; and other components that can be attached to the respective right and left flanges.

Advantageous Effects of Invention

According to the present disclosure, the right and left flanges of the bracket that supports the steering column includes the respective right and left internal protrusions that protrude toward the mount surface from respective right and left flange surfaces which face the mount surface of the vehicle body. The respective right and left internal protrusions are located forwardly in the vehicle-body back-and-forth direction relative to the tightened positions of the right and left bolts, and are located near the internal edges of the respective right and left flanges in the widthwise direction. The right and left flanges extend outwardly in the widthwise direction from the respective upper ends of the right and left side plates. Accordingly, the nearby locations to the internal edges of the respective flanges in the widthwise direction have the highest bending rigidity in the plate thickness direction, and have little distortion. Since the right and left internal protrusions are formed at respective locations where the bending rigidity is the highest, the right and left flanges can surely and firmly depress both the positions of the bolts and the positions of the internal protrusions against the mount surface of the vehicle body. Therefore, fastening force for the right and left flanges to the mount surface can be increased. Consequently, the steering device can be firmly attached to the vehicle body.

DESCRIPTION OF EMBODIMENTS

Embodiments to carry out the present disclosure will be described below with reference to the accompanying figures. Note that, in the following description, terms right and left mean right and left sides with reference to a person in a vehicle, and terms front and rear mean front and rear sides with reference to a travelling direction of the vehicle. Moreover, in the figures, Fr, Rr, Le, Ri, Up, and Dn indicate the front side, the rear side, the left side as viewed from the person in the vehicle, the right side as viewed from the person in the vehicle, the upper side, and the lower side, respectively.

EMBODIMENTS

First Embodiment

Figure 1:
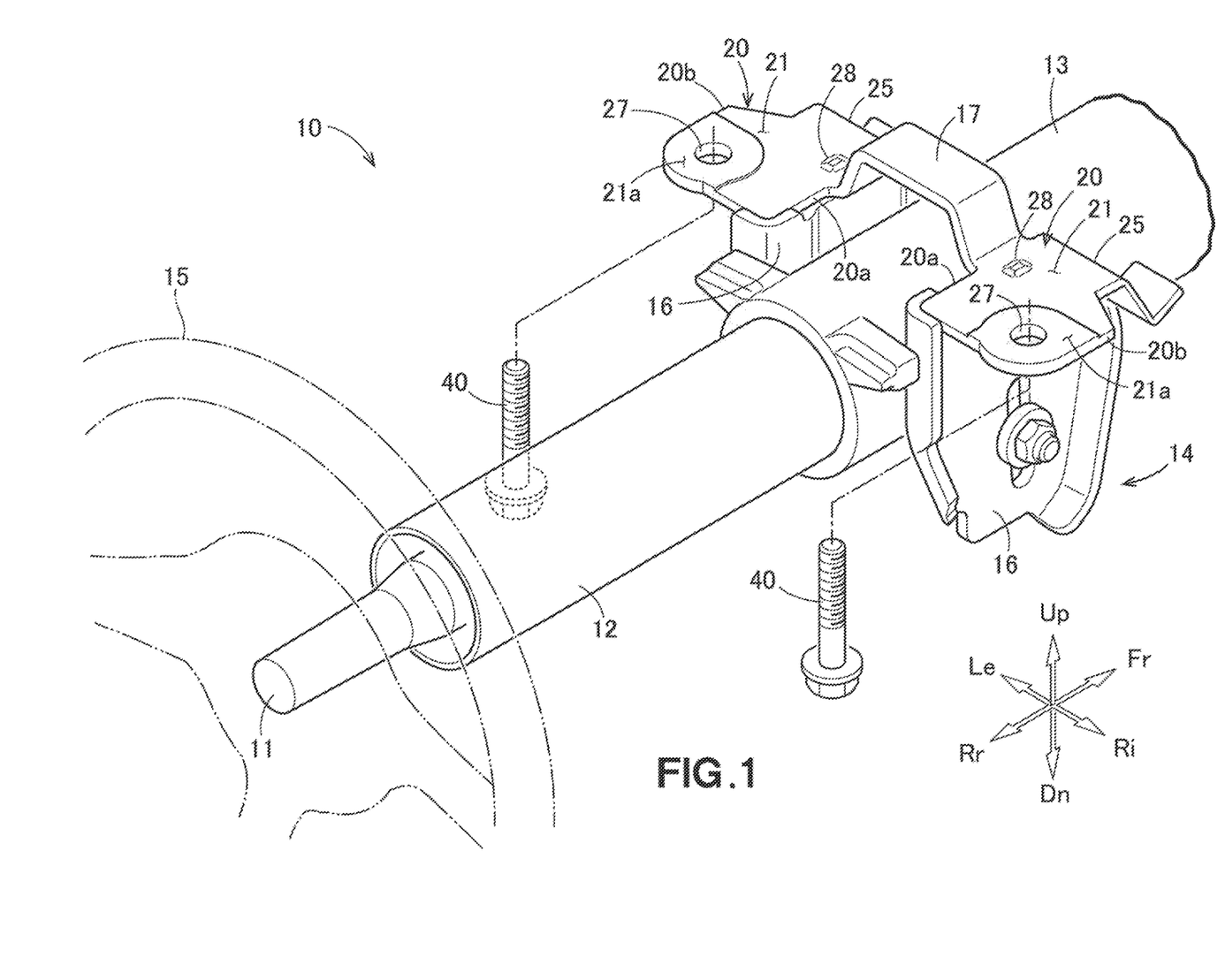
FIG. 1 is a perspective view illustrating a steering device according to a first embodiment of the present disclosure.
Figure 2:
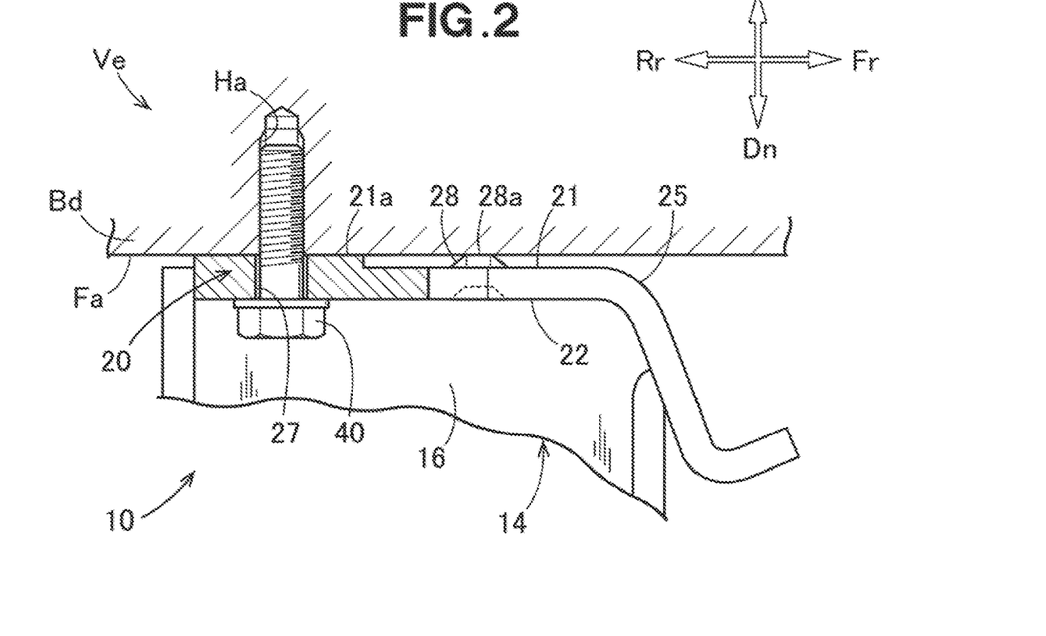
FIG. 2 is a cross-sectional view illustrating a structure in which a right flange in FIG. 1 is fastened to a mount surface of a vehicle body.

A steering device according to a first embodiment will be described with reference to FIGS. 1 to 4. As illustrated in FIGS. 1 and 2, a steering device 10 can be mounted on a mount surface Fa of a vehicle body Bd of a vehicle Ve like a passenger car. The steering device 10 includes a steering shaft 11, a cylindrical inner pipe 12 that supports the steering shaft 11 so as to be turnable, a steering column 13 that holds the inner pipe 12, and a bracket 14 that supports the steering column 13.

More specifically, the inner pipe 12 is held in the steering column 13 (outer column 13) so as to be movable in the vehicle back-and-forth direction. The steering shaft 11 passes completely through the interior of the inner pipe 12. The steering shaft 11 is supported by the inner pipe 12 and by the steering column 13 so as to be turnable. A steering wheel 15 is attached to a rear end of the steering shaft 11.

The bracket 14 includes right and left side plates 16 and 16 that support the steering column 13 from both sides, respectively, in the widthwise direction, and right and left flanges 20 and 20 which extend from respective upper ends of the side plates 16 and 16 toward the external sides in the widthwise direction.

More specifically, the bracket 14 includes the right and left side plates 16 and 16 that are formed at both sides, respectively, in the radial direction of the steering column 13, a coupling portion 17 that couples the respective side plates 16 and 16 to each other, and the right and left flanges 20 and 20. The flanges 20 and 20 are each a substantially rectangular flat plate in parallel with the mount surface Fa of the vehicle body Bd, and extend from respective upper ends of the side plates 16 and 16 outwardly in the widthwise direction.

The respective flanges 20 and 20 are coupled to each other so as to form an integral structure via the coupling portion 17. Internal edges 20a and 20a of the right and left flanges 20 and 20 in the widthwise direction (right and left fixed side portions 20a and 20a near the steering column 13) are located at the respective upper ends of the side plates 16 and 16, and are integrally formed with or integrally joined to the respective upper ends of the side plates 16 and 16. In the flanges 20 and 20, edges 20b and 20b at the opposite sides to the internal edges 20a and 20a in the widthwise direction will be referred to as "external edges 20b and 20b in the widthwise direction".

In the respective flanges 20 and 20, flat surfaces 21 and 21 that face the mount surface Fa of the vehicle body Bd (i.e., is laid over on the mount surface Fa) will be referred to as "flange surfaces 21 and 21", and back surfaces 22 and 22 at the opposite side to the flange surfaces 21 and 21 will be referred to as "flange back surfaces 22 and 22".

Figure 3:
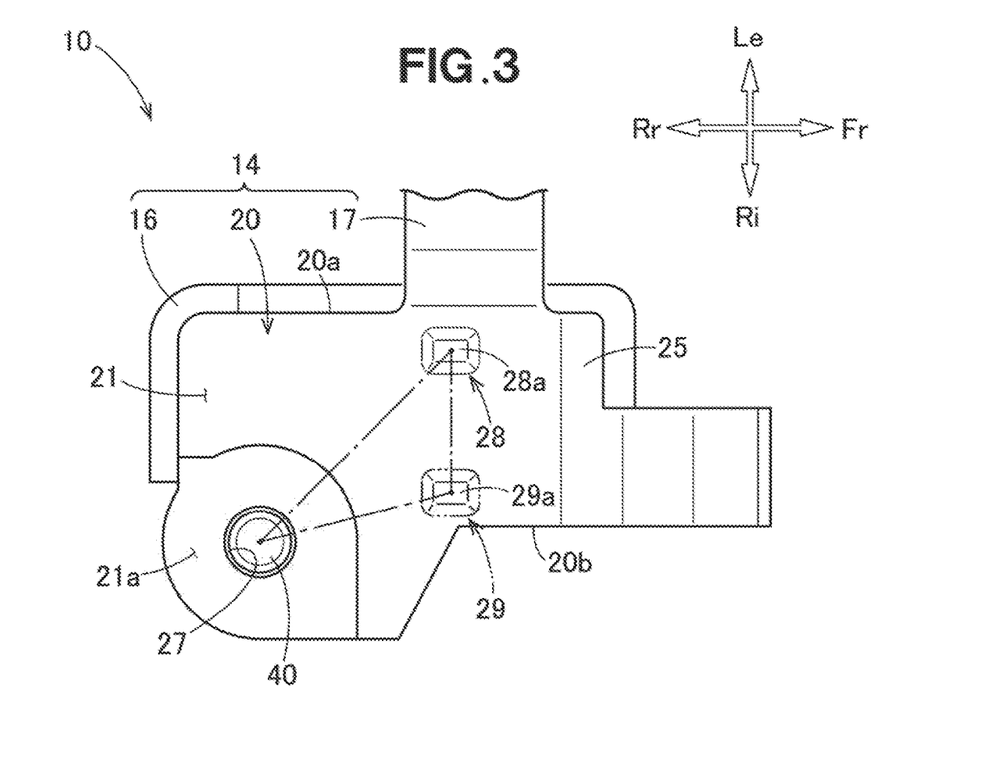
FIG. 3 is a plan view illustrating the right flange in FIG. 1.

With reference to also FIG. 3, edge bent portions 25 and 25 that extend in the front-and-back-surface direction of the flanges 20 and 20 are at least partially provided at respective edges of the flanges 20 and 20. Preferably, the edge bent portions 25 and 25 are bent in the vertical direction (more preferably, downwardly) relative to the flange surfaces 21 and 21. More specifically, the edge bent portions 25 and 25 are provided at opposite edges (front edges) to the steering wheel 15.

Furthermore, the right and left flanges 20 and 20 include respective right and left seat surfaces 21a and 21a, and respective right and left through-holes 27 and 27. The respective seat surfaces 21a and 21a are a flat surface that is slightly one-stage higher toward the mount surface Fa of the vehicle body Bd from the respective flange surfaces 21 and 21, and are in parallel with the flange surfaces 21 and 21. The respective seat surfaces 21a and 21a are formed in the respective regions of the flanges 20 and 20 where the respective through-holes 27 and 27 are located and the surrounding regions thereof.

The steering device 10 includes right and left bolts 40 and 40. The respective bolts 40 and 40 are a kind of fastening member that fastens each of the flanges 20 and 20 to the mount surface Fa of the vehicle body Bd. Screw holes Ha (only one screw hole is illustrated) for turning therein the respective bolts 40 and 40 are formed in the mount surface Fa of the vehicle body Bd.

The respective flanges 20 and 20 are laid over on the mount surface Fa of the vehicle body Bd, and the bolts 40 and 40 are caused to pass completely through the respective through-holes 27 and 27 of the flanges 20 and 20 and to be turned in the respective screw holes Ha. Hence, the flanges 20 and 20 are fastened to the mount surface Fa.

The right and left flanges 20 and 20 include one or more respective right and left internal protrusions 28 and 28 (right and left first protrusions 28 and 28) on the respective flange surfaces 21 and 21. The respective internal protrusions 28 and 28 protrude toward the mount surface Fa from the respective flange surfaces 21 and 21. The protruding amount of the internal protrusions 28 and 28 relative to the respective flange surfaces 21 and 21 is consistent with (including substantially consistent with) the height of the stage defined by the respective seat surfaces 21a and 21a relative to the respective flange surfaces 21 and 21. This enables depressing forces by the respective protrusions 28 and 28 to act on the mount surface Fa of the vehicle body Bd.

The respective internal protrusions 28 and 28 are located forwardly in the vehicle body back-and-forth direction relative to the tightened positions of the bolts 40 and 40, i.e., the respective through-holes 27 and 27, and are located near the internal edges 20a and 20a of the respective flanges 20 and 20 in the widthwise direction. In other words, the respective internal protrusions 28 and 28 are located near the edge bent portions 25 and 25 of the respective flanges 20 and 20, and are located near the internal edges 20a and 20a of the respective flanges 20 and 20 in the widthwise direction (portions near the steering column 13).

The contour of the internal protrusions 28 and 28 is not limited to any particular shape, and for example, may be a circular shape, a polygonal shape, such as a triangular shape or a rectangular shape, or an elongated circular shape when the steering device 10 is viewed in the direction of the flange surfaces 21 and 21.

Figure 4:
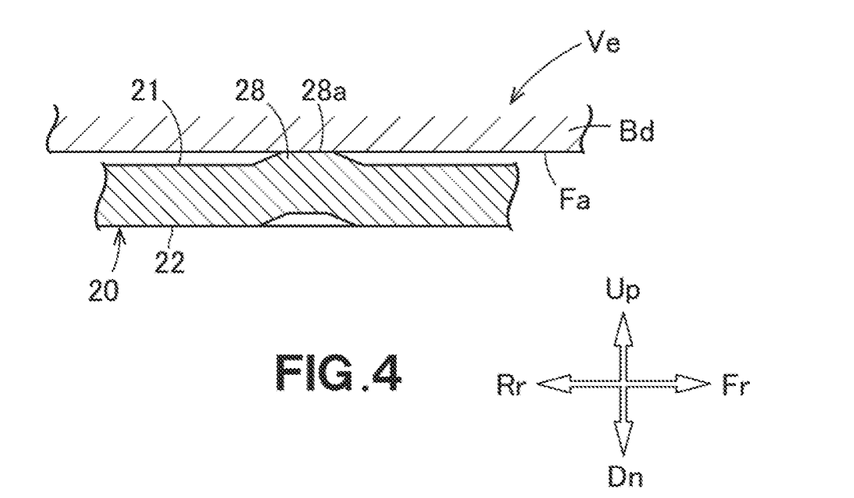
FIG. 4 is a cross-sectional view illustrating a right protrusion in FIG. 2 in an enlarged manner.

With reference to also FIG. 4, it is appropriate if the cross-sectional shape of the respective internal protrusions 28 and 28 should be tapered relative to the respective flange surfaces 21 and 21, and for example, a semi-circular shape, a triangular shape, or a trapezoidal shape can be adopted. The dimension of the vertices 28a and 28a of the respective internal protrusions 28 and 28 is designed so as to contact the mount surface Fa of the vehicle body Bd in a substantially pinpoint manner. This is because if the dimension of the vertices 28a and 28a is too large, it becomes difficult to precisely set the abutment position to the mount surface Fa.

As described above, the internal protrusions 28 and 28 have only the respective vertices 28a and 28a (only one protrusion is illustrated) in contact with the mount surface Fa. The internal protrusions 28 and 28 can cause only the respective vertices 28a and 28a to be in contact with the mount surface Fa in a substantially pinpoint manner. Accordingly, the respective contact positions of the internal protrusions 28 and 28 relative to the mount surface Fa can be set further precisely.

The right and left internal protrusions 28 and 28 may be any one of the followings: respective expanded portions expanded from the respective right and left flanges 20 and 20; respective thickened portions of the respective right and left flanges 20 and 20; or respective other components that can be attached to the respective right and left flanges 20 and 20. This simplifies the structure of the internal protrusions 28 and 28.

The above description can be summarized as follows. As illustrated in FIGS. 1 and 2, the right and left flanges 20 and 20 of the bracket 14 that supports the steering column 13 include the respective right and left internal protrusions 28 and 28 that protrude toward the mount surface Fa from the respective right and left flange surfaces 21 and 21 which face the mount surface Fa of the vehicle body Bd. The respective right and left internal protrusions 28 and 28 are located forwardly in the vehicle-body-Bd back-and-forth direction relative to the tightened positions of the right and left bolts 40 and 40, and are located near the internal edges 20a and 20a of the respective right and left flanges 20 and 20 in the widthwise direction. The right and left flanges 20 and 20 extend outwardly in the widthwise direction from the respective upper ends of the right and left side plates 16 and 16.

Accordingly, the nearby locations to the internal edges of the respective flanges 20 and 20 in the widthwise direction have the highest bending rigidity in the plate thickness direction, and have little distortion. Since the internal protrusions 28 and 28 are formed at respective locations where the bending rigidity is the highest, the flanges 20 and 20 can surely and firmly depress both the positions of the bolts 40 and 40 and the positions of the internal protrusions 28 and 28 against the mount surface Fa of the vehicle body Bd. Therefore, fastening force for the flanges 20 and 20 to the mount surface Fa can be increased. Consequently, the steering device 10 can be firmly attached to the vehicle body Bd.

Figure 5:
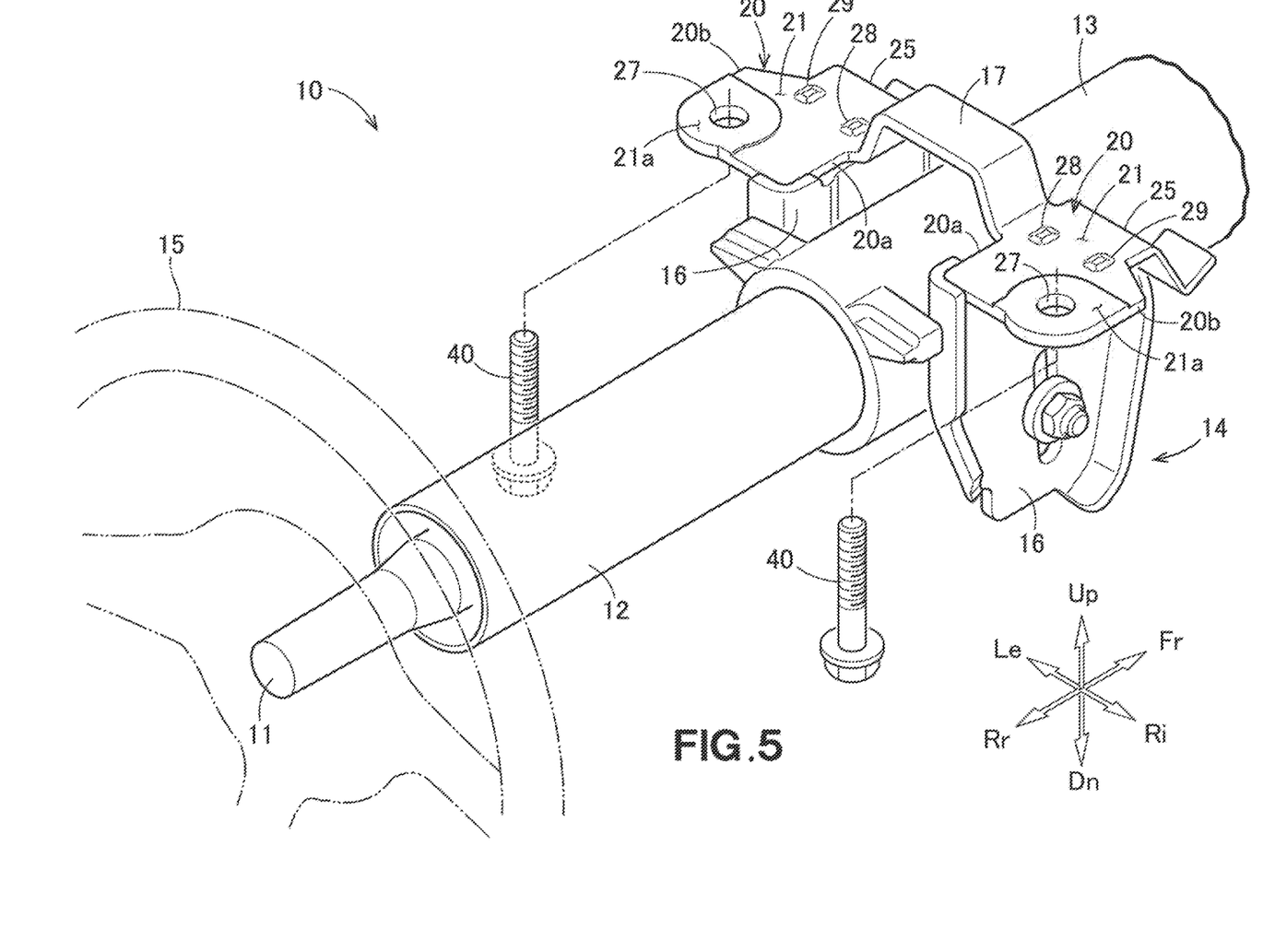
FIG. 5 is a perspective view illustrating a steering device according to a modified example of the first embodiment of the present disclosure.

A modified example of the steering device 10 will be described. As illustrated in FIGS. 3 and 5, according to the modified example, the right and left flanges 20 and 20 further include one or more respective right and left external protrusions 29 and 29 (right and left second protrusions 29 and 29) on the respective flange surfaces 21 and 21 in addition to the respective right and left internal protrusions 28 and 28. The respective right and left external protrusions 29 and 29 protrude toward the mount surface Fa from the respective right and left flange surfaces 21 and 21. The respective right and left external protrusions 29 and 29 are located forwardly in the vehicle body back-and-forth direction relative to the tightened positions of the right and left bolts 40 and 40, and are located near the external edges 20b and 20b of the respective right and left flanges 20 and 20 in the widthwise direction. This enables depressing force by the right and left external protrusions 29 and 29 to act on the mount surface Fa of the vehicle body Bd.

The cross-sectional shape of the respective external protrusions 29 and 29 is consistent with the cross-sectional shape of the respective internal protrusions 28 and 28 (see FIG. 4). Moreover, the dimension of respective the vertices 29a and 29a (only one vertex is illustrated) of the external protrusions 29 and 29 are consistent with the dimension of the respective vertices 28a and 28a of the internal protrusions 28 and 28. The external protrusions 29 and 29 have only the respective vertices 29a and 29a (only one vertex is illustrated) in contact with the mount surface Fa. The external protrusions 29 and 29 can cause substantially only the vertices 29a and 29a to be in contact with the mount surface Fa in a pinpoint manner. Hence, the contact positions of the external protrusions 29 and 29 relative to the mount surface Fa can be set further precisely.

Moreover, like the right and left internal protrusions 28 and 28, the right and left external protrusions 29 and 29 may be any one of the followings: respective expanded portions expanded from the respective right and left flanges 20 and 20; respective thickened portions of the respective right and left flanges 20 and 20; or respective other components that can be attached to the respective right and left flanges 20 and 20. This simplifies the structure of the external protrusions 29 and 29.

As described above, the two protrusions 28 and 29 are formed on each of the flanges 20 and 20 at both sides, respectively, in the widthwise direction. The respective right and left two protrusions 28 and 28, and, 29 and 29 are located forwardly in the vehicle back-and-forth direction relative to the bolts 40 and 40, and are arranged in the vertical direction relative to the axial direction of the steering shaft 11. Therefore, the flanges 20 and 20 can be further stably fastened to the mount surface Fa of the vehicle body Bd.

Furthermore, the two protrusions 28 and 28, and, 29 and 29 for each of the flanges 20 and 20 are located forwardly in the vehicle back-and-forth direction relative to the bolts 40 and 40. Accordingly, when the flanges 20 and 20 are viewed in the front-and-back-surface direction, the respective two right and left protrusions 28 and 28, and, 29 and 29 and the respective bolts 40 and 40 can be placed at the respective vertices of a triangle. Accordingly, the flanges 20 and 20 can be further stably fastened to the mount surface Fa of the vehicle body Bd.

Second Embodiment

A steering device according to a second embodiment will be described with reference to FIGS. 6 to 10. A steering device 100 according to the second embodiment has changes in the following features in comparison with the above-described steering device 10 according to the first embodiment illustrated in FIGS. 1 to 4, and since other features are the same as those of the first embodiment, the description thereof will be omitted. A first change is that the bracket 14 according to the first embodiment is changed to a bracket 114 illustrated in FIGS. 6 to 10. A second change is that right and left capsules 130 and 130 are added.

Figure 6:
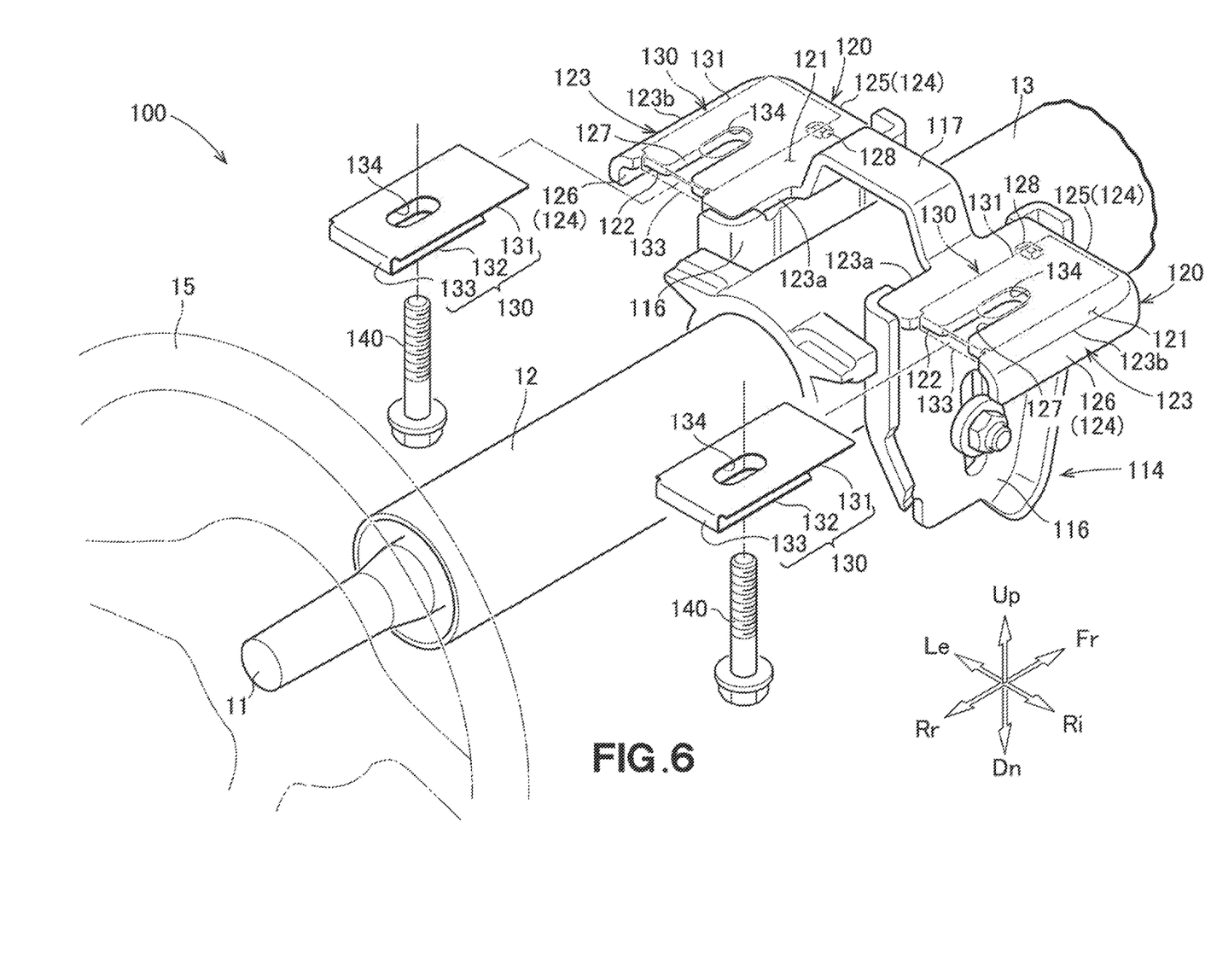
FIG. 6 is a perspective view illustrating a steering device according to a second embodiment of the present disclosure.
Figure 7:
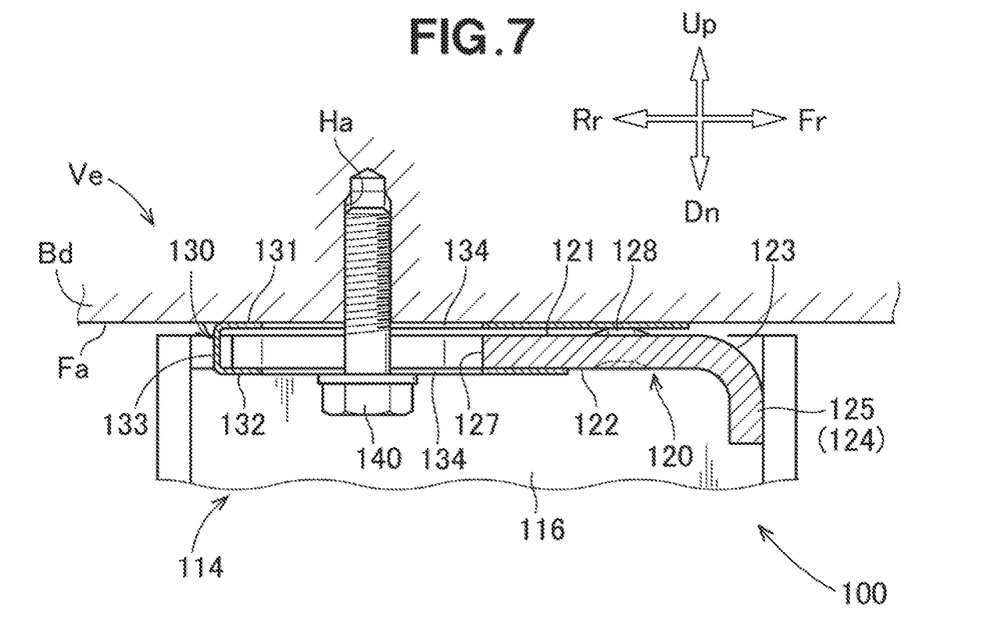
FIG. 7 is a cross-sectional view illustrating a structure in which a right flange and a capsule in FIG. 6 are fastened to a mount surface of a vehicle body.

As illustrated in FIGS. 6 and 7, the bracket 114 according to the second embodiment includes right and left side plates 116 and 116 that support the steering column 13 from both sides, respectively, in the widthwise direction, and right and left flanges 120 and 120 that extend toward outwardly in the widthwise direction from respective upper ends of the side plates 116 and 116.

More specifically, the bracket 114 includes the side plates 116 and 116 that are respectively formed at both sides of the steering column 13 in the radial direction, a coupling portion 117 that couples the side plates 116 and 116 to each other, and the flanges 120 and 120. The flanges 120 and 120 are a substantially rectangular flat plate in parallel with the mount surface Fa of the vehicle body Bd, and extend from the respective upper ends of the side plates 116 and 116 outwardly in the widthwise direction.

The right and left flanges 120 and 120 are coupled to each other so as to form an integral structure by the coupling portion 117.

In this case, in the respective flanges 120 and 120, respective flat surfaces 121 and 121 that face the mount surface Fa of the vehicle body Bd (i.e., is laid over on the mount surface Fa) will be referred to as "flange surfaces 121 and 121", and back surfaces 122 and 122 at opposite side to the respective flange surfaces 121 and 121 will be referred to as "flange back surfaces 122 and 122".

Figure 8:
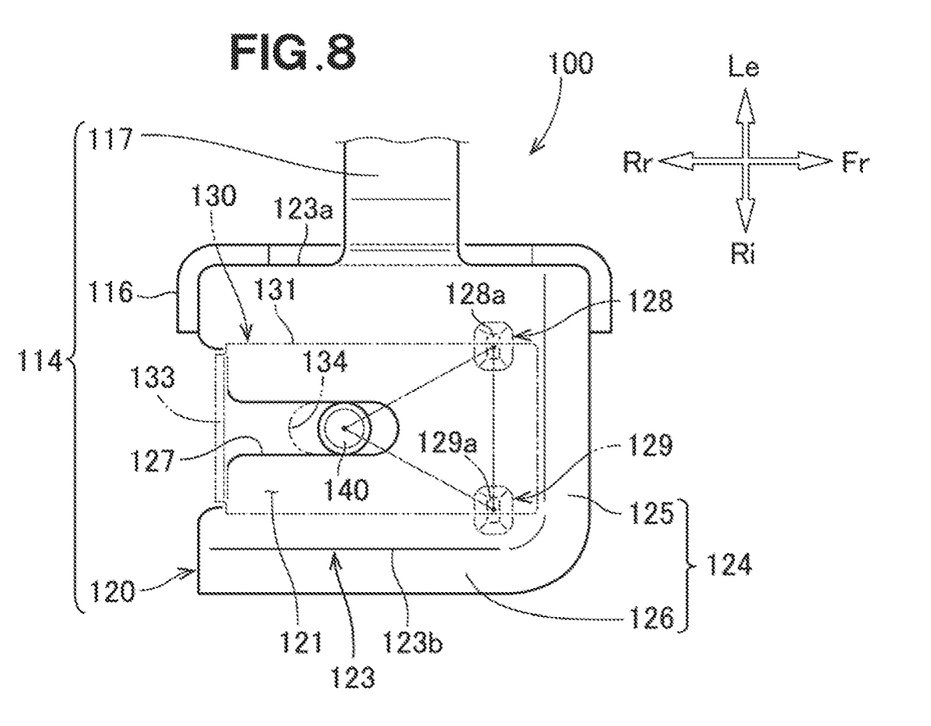
FIG. 8 is a plan view illustrating the right flange in FIG. 6.

With reference to also FIG. 8, in respective edges 123 and 123 of the right and left flanges 120 and 120, internal edges 123a and 123a (right and left fixed side portions 123a and 123a near the steering column 13) in the widthwise direction are located on respective upper ends of the side plates 116 and 116, and are formed integrally or joined integrally with the respective upper ends of the side plates 116 and 116. Edges 123b and 123b at the opposite side in the widthwise direction to the internal edges 123a and 123a in the respective edges 123 and 123 of the flanges 120 and 120 will be referred to as "external edges 123b and 123b in the widthwise direction".

Edge bent portions 124 and 124 extended in the front-and-back-surface direction of the flanges 120 and 120 are at least partially formed in the respective edges 123 and 123 of the flanges 120 and 120. Preferably, the edge bent portions 124 and 124 are bent in the vertical direction (more preferably, downwardly) relative to the flange surfaces 121 and 121. More specifically, the edge bent portions 124 and 124 include respective front-side edge bent portions 125 and 125, and width-side edge bent portions 126 and 126, and those are continuous from each other. The front-side edge bent portions 125 and 125 are formed in the edge (front edge) at the opposite side to the steering wheel 15. The width-side edge bent portions 126 and 126 are formed in the edge (side edge) at the opposite side to the steering column 13.

Furthermore, notch holes 127 and 127 are formed in the flanges 120 and 120. The respective notch holes 127 and 127 are elongated in the axial direction of the steering shaft 11, and cut out in the respective rear ends of the flanges 120 and 120 (at the steering-wheel-15 side).

The steering device 100 includes the right and left capsules 130 and 130, and right and left bolt 140 and 140.

Figure 9:
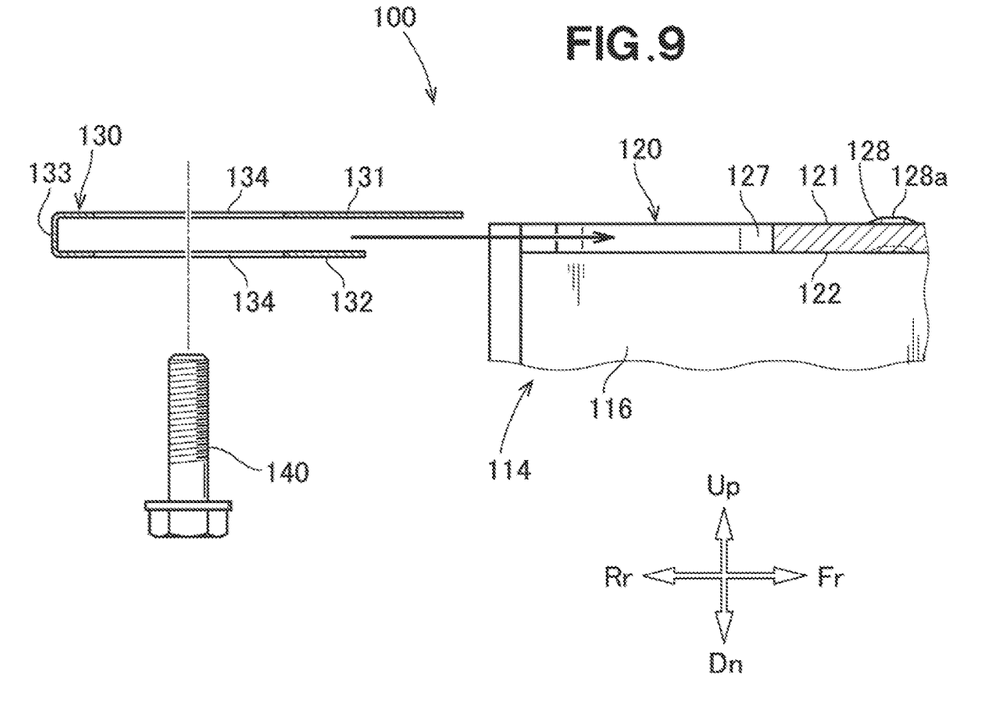
FIG. 9 is an exploded view of the right flange and the capsule in FIG. 7.

With reference to also FIG. 9, the right and left capsules 130 and 130 (sliding plates 130 and 130) are members that have a substantially U-shaped cross-sectional shape which can be laid over on the mount surface Fa of the vehicle body Bd with the front and back surfaces of the respective flanges 120 and 120 being held therebetween. The capsules 130 and 130 are each formed of, for example, a resin-mold component or a pressed metal piece. The capsule 130 and 130 are integral components that include respective vehicle-body-side capsule portions 131 and 131 in a planar shape, and respective column-side capsule portions 132 and 132 in a plate shape, and respective bent portions 133 and 133 in a substantially U-shape.

The vehicle-body-side capsule portions 131 and 131 are a flat plate that can be present between the mount surface Fa and the respective flanges 120 and 120, and can be laid over thereon. The respective column-side capsule portions 132 and 132 are a flat plate that can be laid over on the flange back surfaces 122 and 122. The respective bent portions 133 and 133 connect the respective vehicle-body-side capsule portions 131 and 131 and the respective column-side capsule portions 132 and 132, and are located near the respective rear ends of the flanges 120 and 120. The bending rigidity of the respective flanges 120 and 120 in the plate thickness direction is larger than the bending rigidity of the capsules 130 and 130 (in particular, the vehicle-body-side capsule portions 131 and 131).

Elongated holes 134 and 134 that pass completely through in the plate-surface direction are formed in each of the vehicle-body-side capsule portions 131 and 131 and each of the column-side capsule portions 132 and 132. These elongated holes 134 and 134 are formed so as to be elongated in the axial direction of the steering shaft 11, and cause respective positions of the notch holes 127 and 127 to be aligned with the capsules 130 and 130 holding therebetween the respective flanges 120 and 120.

The bolts 140 and 140 are a kind of fastening member that fastens the respective flanges 120 and 120 with the respective capsules 130 and 130 to the mount surface Fa of the vehicle body Bd. Screw hole Ha (only one screw hole is illustrated) for turning therein the respective bolts 140 and 140 are formed in the mount surface Fa of the vehicle body Bd.

With the front and back surfaces of the respective flanges 120 and 120 being held by the respective capsules 130 and 130, and the respective capsules being laid over on the mount surface Fa of the vehicle body Bd, the bolts 140 and 140 are caused to pass completely through the elongated holes 134 and 134 of the respective column-side capsule portions 132 and 132, the notch holes 127 and 127 of the flanges 120 and 120, and the elongated holes 134 and 134 of the vehicle-body-side capsule portion 131 and 131, and turned in the respective screw holes Ha. Accordingly, the flanges 120 and 120 and the capsules 130 and 130 are fastened to the mount surface Fa.

The flanges 120 and 120 include one or more respective right and left internal protrusions 128 and 128 (right and left first protrusions 128 and 128) on the respective flange surfaces 121 and 121. For example, the respective internal protrusions 128 and 128 are provided on the respective flanges 120 and 120 one by one. With the front and back surfaces of the respective flanges 120 and 120 being held by the respective capsules 130 and 130, the internal protrusions 128 and 128 protrude toward the respective vehicle-body-side capsule portions 131 and 131, and can contact the respective vehicle-body-side capsule portion 131 and 131. This enables depressing force by the internal protrusions 128 and 128 to act on the mount surface Fa of the vehicle body Bd via the respective capsules 130 and 130.

The respective internal protrusions 128 and 128 are located forwardly in the vehicle body back-and-forth direction relative to the tightened positions of the bolts 140 and 140, i.e., the respective notch holes 127 and 127, and are located near the internal edges 123a and 123a of the respective flanges 120 and 120 in the widthwise direction. In other words, the respective internal protrusions 128 and 128 are located near the front-side edge bent portions 125 and 125 of the respective flanges 120 and 120, and are located near the internal edges 123a and 123a of the respective flanges 120 and 120 in the widthwise direction (portions near the steering column 13).

The vehicle-body-side capsule portions 131 and 131 are substantially entirely laid over on the mount surface Fa of the vehicle body Bd. By fastening the flanges 120 and 120 and the capsules 130 and 130 against the mount surface Fa of the vehicle body Bd by the bolts 140,140, the protrusions 128 and 128 depress the vehicle-body-side capsule portions 131 and 131 against the mount surface Fa.

That is, by tightening the bolts 140 and 140, the flanges 120 and 120 and the capsules 130 and 130 are depressed against the mount surface Fa of the vehicle body Bd at the positions of the bolts, and are also depressed against the mount surface Fa at the positions of the right and left internal protrusions 128 and 128. This enables depressing force by the internal protrusions 128 and 128 to act on the mount surface Fa of the vehicle body Bd via the capsules 130 and 130, and thus the steering device 100 can be firmly attached to the vehicle body Bd.

Moreover, the internal protrusions 128 and 128 are located not between the mount surface Fa of the vehicle body Bd and the vehicle-body-side capsule portions 131 and 131, but between the vehicle-body-side capsule portions 131 and 131 and the respective flanges 120 and 120. Hence, in a normal condition in which no secondary collision is occurring, the flanges 120 and 120 and the capsules 130 and 130 can be stably fixed to the mount surface Fa of the vehicle body Bd. Consequently, appropriate fastening force for the flanges 120 and 120 and the capsules 130 and 130 to the mount surface Fa of the vehicle body Bd can be sufficiently secured.

When the front section of a vehicle Ve collides (collides with a forehead object), shock due to secondary collision acts on the steering column 13 from the steering wheel 15. At the time of the secondary collision, the flanges 120 and 120 can be smoothly detached from the respective capsule 130 and 130 to the forward side of the vehicle. Consequently, the steering column 13 that has received the shock can be smoothly moved forwardly relative to the vehicle body Bd, and can be detached.

Furthermore, as described above, the bending rigidity of the flanges 120 and 120 in the plate thickness direction is larger than the bending rigidity of the vehicle-body-side capsule portion. Hence, since the vehicle-body-side capsule portions 131 and 131 are depressed against the mount surface Fa of the vehicle body Bd via the protrusion 128 and 128 by the fastening force of the bolts 140 and 140, an initial load at which the flanges 120 and 120 start relative movement to the capsules 130 and 130 at the time of the secondary collision can be set relatively large.

Still further, as described above, since a structure is employed in which the internal protrusions 128 and 128 and the mount surface Fa of the vehicle body Bd are not in contact with each other directly, a dimensional management on the internal protrusions 128 and 128 are facilitated. That is, the number of management steps for the dimensional precision does not increase. Yet still further, since the internal protrusions 128 and 128 are formed at positions contacting the respective vehicle-body-side capsule portions 131 and 131 of the capsules 130 and 130, positioning of the internal protrusions 128 and 128 relative to the capsules 130 and 130 is unnecessary, and the number of assembling management steps for assembling the capsules 130 and 130 to the respective flanges 120, 120 does not increase.

Meanwhile, an example general technology that utilizes capsules is a steering device disclosed in Japan Patent No. 4062187. An outline of this general steering device will be described. A capsule has a pair of elastically contact portions that protrude toward a mount surface of a vehicle body. The pair of elastically contact portions is portions in an arch-like shape cut and raised from the tabular capsule, and functions as plate springs located at both sides of a bolt, respectively. That is, the elastically contact portion has a spring characteristic in the plate thickness direction. The bolts fasten the flange and the capsule against the mount surface of the vehicle body. When the bolt is tightened, the elastically contact portion contacts the mount surface of the vehicle body with elastic force. Thus, the steering device can stabilize the fastening force by the bolt by the elastically contact portion provided on the capsule.

However, in order to stabilize the fastening force by the bolt, it is necessary for the pair of elastically contact portions to satisfy a condition of having a predetermined spring characteristic (elasticity). When the spring characteristic is too little, i.e., when the elastic deformation amount of the elastically contact portion relative to the fastening force by the bolt is too small, the elastically contact portion can be easily collapsed by small fastening force. In this case, it is difficult to stabilize the fastening force. In order to cause the elastically contact portion to have the predetermined spring characteristic, it is necessary to cause the plate thickness of the capsule to be equal to or greater than a predetermined value. However, there is a limit in thickening of the plate thickness of the capsule, and there is a leeway for improvement. Moreover, if the capsule is not precisely assembled with the flange, the positions of the pair of elastically contact portions relative to the flange are not precisely defined. Therefore, there is a possibility such that the number of assembling steps may increase.

Conversely, according to the steering device 100 of the second embodiment, the number of assembling and management steps for assembling the capsules 130 and 130 with the respective flanges 120 and 120 does not increase.

Furthermore, the internal protrusions 128 and 128 are formed inwardly in the widthwise direction relative to the respective flanges 120 and 120. The nearby locations to the internal edges of the respective flanges 120 and 120 in the widthwise direction have the highest bending rigidity in the plate thickness direction, and have little distortion. By forming the internal protrusions 128 and 128 at the locations where the bending rigidity is the highest, the vehicle-body-side capsule portions 131 and 131 can be surely and firmly depressed against the mount surface Fa at positions of the internal protrusions 128 and 128 in addition to the positions of the bolts 140 and 140.

The contour of the internal protrusions 128 and 128 is not limited to any particular shape, but for example, may be a rounded shape (including a circular shape), a polygonal shape, such as a triangular shape or a rectangular shape, or an elongated circular shape when the steering device 100 is viewed in the direction of the flange surfaces 121 and 121. When the contour of the internal protrusions 128 and 128 is a thin and elongated circular shape in the vehicle widthwise direction, even if the holding positions of the capsules 130 and 130 relative to the respective flange surfaces 121 and 121 are slightly shifted in the vehicle widthwise direction, the internal protrusions 128 and 128 can be surely caused to contact the vehicle-body-side capsule portions 131 and 131.

Figure 10:
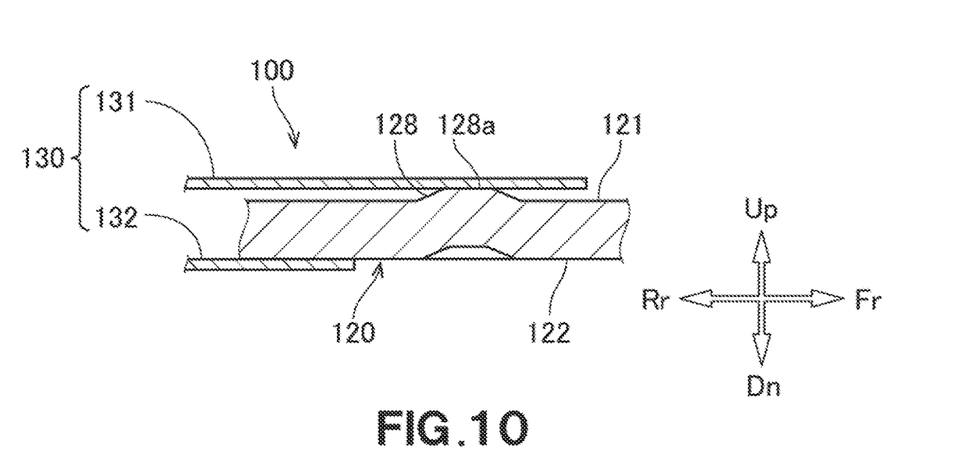
FIG. 10 is a cross-sectional view illustrating a right protrusion in FIG. 7 in an enlarged manner.

With reference to also FIG. 10, it is appropriate if the cross-sectional shape of the internal protrusions 128 and 128 is tapered relative to the respective flange surfaces 121 and 121, and for example, a semi-circular shape, a triangular shape, or a trapezoidal shape can be adopted. The dimension of vertices 128a and 128a of the respective internal protrusions 128 and 128 is designed so as to contact the respective vehicle-body-side capsule portions 131 and 131 in a substantially pinpoint manner. This is because if the dimension of the vertices 128a and 128a is too large, it becomes difficult to precisely set the abutment positions to the respective vehicle-body-side capsules 131 and 131.

As described above, the internal protrusions 128 and 128 have only the respective vertices 128a and 128a in contact with the respective vehicle-body-side capsule portions 131 and 131. The internal protrusions 128 and 128 can cause only the respective vertices 128a and 128a to be in contact with the respective vehicle-body-side capsules 131 and 131 in a substantially pinpoint manner. Accordingly, the respective contact positions of the internal protrusions 128 and 128 relative to the respective vehicle-body-side capsule portions 131 and 131 can be set further precisely.

The right and left internal protrusions 128 and 128 may be any one of the followings: respective expanded portions expanded from the respective right and left flanges 120 and 120; respective thickened portions of the respective right and left flanges 120 and 120; or respective other components that can be attached to the respective right and left flanges 120 and 120. This simplifies the structure of the respective right and left internal protrusions 128 and 128.

The above description can be summarized as follows. As illustrated in FIGS. 6 and 7, the right and left flanges 120 and 120 of the bracket 114 that supports the steering column 13 include the respective right and left internal protrusions 128 and 128 which protrude toward the mount surface Fa of the vehicle body Bd from the respective right and left flange surfaces 121 and 121 that face the mount surface Fa. The right and left internal protrusions 128 and 128 are located forwardly in the vehicle-body-Bd back-and-forth direction relative to the tightened positions of the right and left bolts 140 and 140, and are located near the internal edges 123a and 123a of the respective right and left flanges 120 and 120 in the widthwise direction. The right and left flanges 120 and 120 extend outwardly in the widthwise direction from the respective upper ends of the right and left side plates 116 and 116.

Accordingly, the nearby locations to the internal edges of the respective flanges 120 and 120 in the widthwise direction have the highest bending rigidity in the plate thickness direction, and have little distortion. Since the internal protrusions 128 and 128 are formed at respective locations where the bending rigidity is the highest, the flanges 120 and 120 can surely and firmly depress both the positions of the bolts 140 and 140 and the positions of the internal protrusions 128 and 128 against the mount surface Fa of the vehicle body Bd. Therefore, fastening force for the flanges 120 and 120 to the mount surface Fa can be increased. Consequently, the steering device 100 can be firmly attached to the vehicle body Bd.

Figure 11:
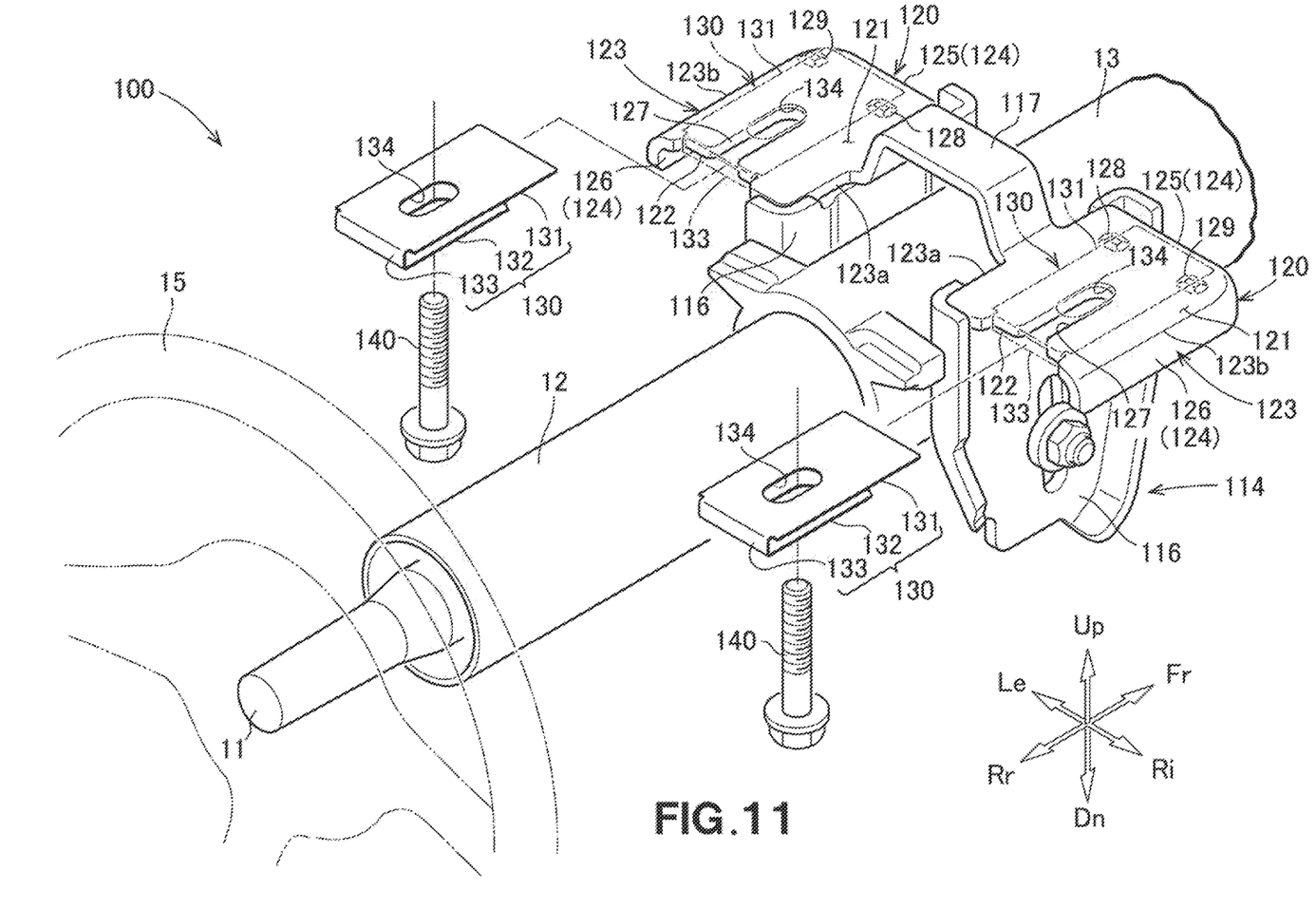
FIG. 11 is a perspective view illustrating a steering device according to a modified example of the second embodiment of the present disclosure.

A modified example of the steering device 100 will be described. As illustrated in FIGS. 8 and 11, according to the modified example, the flanges 120 and 120 at both sides, respectively, in the widthwise direction further include one or more respective right and left external protrusions 129 and 129 (right and left second protrusions 129 and 129) on the respective flange surfaces 121 and 121 in addition to the respective right and left internal protrusions 128 and 128. The right and left external protrusions 129 and 129 extend toward the mount surface Fa from the respective right and left flange surfaces 121 and 121. The right and left external protrusions 129 and 129 are located forwardly in the vehicle body back-and-forth direction relative to the tightened positions of the right and left bolts 140 and 140, and are located near respective external edges 123b and 123b of the right and left flanges 120 and 120 in the widthwise direction. This enables depressing force by the external protrusions 129 and 129 to act on the mount surface Fa of the vehicle body Bd.

That is, these protrusions 128 and 128, and, 129 and 129 are located forwardly in the vehicle back-and-forth direction relative to the bolts 140 and 140, and are arranged in the vertical direction relative to the axial direction of the steering shaft 11. Therefore, the flanges 120 and 120 and the capsules 130 and 130 can be further stably fastened to the mount surface Fa of the vehicle body Bd.

Furthermore, the two protrusions 128 and 128, and 129 and 129 for each of the flanges 120 and 120 are located forwardly in the vehicle back-and-forth direction relative to the bolts 140 and 140. Accordingly, when the flanges 120 and 120 are viewed in the front-and-back-surface direction, the respective two right and left protrusions 128 and 129 and the respective bolts 140 and 140 can be placed at the respective vertices of a triangle. Accordingly, the flanges 120 and 120 and the capsules 130 and 130 can be further stably fastened to the mount surface Fa of the vehicle body Bd.

The cross-sectional shape of the respective external protrusions 129 and 129 is consistent with the cross-sectional shape of the respective internal protrusions 128 and 128 (see FIG. 10). Moreover, the dimension of the respective vertices 129a and 129a of the external protrusions 129 and 129 are consistent with the dimension of the respective vertices 128a and 128a of the internal protrusions 128 and 128. Moreover, like the internal protrusions 128 and 128, the external protrusions 129 and 129 may be any one of the followings: respective expanded portions expanded from the respective flanges 120 and 120; respective thickened portions of the respective flanges 120 and 120; or respective other components that can be attached to the respective flanges 120 and 120. This simplifies the structure of the external protrusions 129 and 129.

Moreover, like the right and left internal protrusions 128 and 128, the right and left external protrusions 129 and 129 may be any one of the followings: respective expanded portions expanded from the respective right and left flanges 120 and 120; respective thickened portions of the respective right and left flanges 120 and 120; or respective other components that can be attached to the respective right and left flanges 120 and 120. This simplifies the structure of the external protrusions 129 and 129.

Note that the present disclosure is not limited to the embodiments as long as the same advantageous action and effect as those of the present disclosure are achievable.

INDUSTRIAL APPLICABILITY

The steering devices 10 and 100 according to the present disclosure are suitably applicable to a steering system of a passenger car.

REFERENCE SIGNS LIST

Bd Vehicle body
Fa Mount surface
10, 100 Steering device
11 Steering shaft
13 Steering column
14, 114 Bracket
16, 116 Side plate
20, 120 Flange
21, 121 Flange surface
123 Edge of flange
28, 128 Internal protrusion
28a, 128a Vertex
29, 129 External protrusion
29a, 129a Vertex
40, 140 Bolt
130 Capsule
131 Vehicle-body-side capsule portion

The invention claimed is:

1. A steering device comprising:
a steering column that supports a steering shaft so as to be turnable;
a bracket comprising: right and left side plates that support the steering column from both sides, respectively, in a widthwise direction; and right and left flanges that extend outwardly in the widthwise direction from respective upper ends of the right and left side plates; and
right and left bolts that fasten the right and left flanges to a mount surface of a vehicle body,
wherein the right and left flanges each have a one-piece construction, and comprise respective right and left internal protrusions that are part of the one-piece construction of the respective right and left flanges,
wherein the right and left internal protrusions protrude toward the mount surface from respective right and left flange surfaces which face the mount surface of the vehicle body,
wherein the right and left internal protrusions are located forwardly in a vehicle body back-and-forth direction relative to tightened positions of the right and left bolts, and are located near respective internal edges of the right and left flanges in the widthwise direction,
wherein the right and left flanges comprise respective right and left seat surfaces, and respective right and left through-holes in the respective right and left seat surfaces,
wherein the right and left seat surfaces protrude toward the mount surface from the respective right and left flange surfaces, and
wherein the right and left bolts are inserted through the respective right and left through-holes to fasten the respective right and left flanges to the mount surface.

2. The steering device according to claim 1, further comprising right and left capsules which hold therebetween front and back surfaces of the respective right and left flanges, and which have a substantially U-shaped cross-sectional shape,
wherein the right and left capsules comprise respective right and left vehicle-body-side capsule portions that are present between the mount surface and the respective right and left flanges,
wherein the right and left internal protrusions are in contact with the respective right and left vehicle-body-side capsule portions, and
wherein the right and left capsules are fastened to the mount surface of the vehicle body together with the respective right and left flanges by the respective right and left bolts.

3. The steering device according to claim 2, further comprising right and left external protrusions as part of the one-piece construction of the respective right and left flanges,
wherein the right and left external protrusions protrude toward the mount surface of the vehicle body from the respective right and left flange surfaces,
wherein the right and left external protrusions are located forwardly in the vehicle body back-and-forth direction relative to the tightened positions of the right and left bolts, and are located near respective external edges of the right and left flanges in the widthwise direction.

4. The steering device according to claim 3, wherein the right and left internal protrusions and the right and left external protrusions are each any one of the followings: expanded portions expanded from the respective right and left flanges; or thickened portions of the respective right and left flanges.

5. The steering device according to claim 2, wherein the right and left internal protrusions are each any one of the followings: expanded portions expanded from the respective right and left flanges; or thickened portions of the respective right and left flanges.

6. The steering device according to claim 1, further comprising right and left external protrusions as part of the one-piece construction of the respective right and left flanges,
wherein the right and left external protrusions protrude toward the mount surface of the vehicle body from the respective right and left flange surfaces,
wherein the right and left external protrusions are located forwardly in the vehicle body back-and-forth direction relative to the tightened positions of the right and left bolts, and are located near respective external edges of the right and left flanges in the widthwise direction.

7. The steering device according to claim 6, wherein the right and left internal protrusions and the right and left external protrusions are each any one of the followings: expanded portions expanded from the respective right and left flanges; or thickened portions of the respective right and left flanges.

8. The steering device according to claim 6, wherein the right and left external protrusions are in contact with the respective right and left vehicle-body-side capsule portions.

9. The steering device according to claim 6, wherein the right and left external protrusions are in contact with the mount surface.

10. The steering device according to claim 1, wherein the right and left internal protrusions are each any one of the followings: expanded portions expanded from the respective right and left flanges; or thickened portions of the respective right and left flanges.

11. The steering device according to claim 1, further including a coupling portion that couples the right and left side plates to each other above the steering column and couples the left and right flanges to each other above the steering column.

12. The steering device according to claim 11, wherein the coupling portion and the right and left flanges together have a one-piece construction.

13. The steering device according to claim 1, wherein the right and left internal protrusions contact the mount surface.

14. A steering device comprising:
   a steering column that supports a steering shaft so as to be turnable;
   a bracket comprising: right and left side plates that support the steering column from both sides, respectively, in a widthwise direction; and right and left flanges that extend outwardly in the widthwise direction from respective upper ends of the right and left side plates; and
   right and left bolts that fasten the right and left flanges to a mount surface of a vehicle body,
   wherein the right and left flanges each have a one-piece construction, and comprise respective right and left internal protrusions that are part of the one-piece construction of the respective right and left flanges,
   wherein the right and left internal protrusions protrude toward the mount surface from respective right and left flange surfaces which face the mount surface of the vehicle body,
   wherein the right and left internal protrusions are located forwardly in a vehicle body back-and-forth direction relative to tightened positions of the right and left bolts, and are located near respective internal edges of the right and left flanges in the widthwise direction,
   wherein the right and left flanges comprise respective right and left seat surfaces, and respective right and left through-holes in the respective right and left seat surfaces,
   wherein the right and left seat surfaces protrude toward the mount surface from the respective right and left flange surfaces,
   wherein the right and left bolts are inserted through the respective right and left through-holes to fasten the respective right and left flanges to the mount surface, and
   wherein the right and left seat surfaces and the right and left internal protrusions protrude by an equal amount from the respective right and left flange surface.

* * * * *